US00RE39698E

(19) United States
(12) Reissued Patent
Grilliot et al.

(10) Patent Number: US RE39,698 E
(45) Date of Reissued Patent: Jun. 26, 2007

(54) PROTECTIVE GARMENT ADAPTED TO BE SELECTIVELY CONFIGURED

(75) Inventors: William L. Grilliot, Dayton, OH (US); Mary I. Grilliot, Dayton, OH (US)

(73) Assignee: Morning Pride Manufacturing, L.L.C., Dayton, OH (US)

(21) Appl. No.: 10/761,097

(22) Filed: Jan. 20, 2004

Related U.S. Patent Documents

Reissue of:
(64) Patent No.: 6,339,843
Issued: Jan. 22, 2002
Appl. No.: 09/772,040
Filed: Jan. 29, 2001

(51) Int. Cl.
*A41D 13/00* (2006.01)

(52) U.S. Cl. ..... 2/97; 2/81
(58) Field of Classification Search ..... 2/456, 2/457, 49.4, 49.5, 69, 81, 126, 93, 164, 70, 2/97, 102, 272, 108, 904, 915, DIG. 2
See application file for complete search history.

(56) References Cited

U.S. PATENT DOCUMENTS 4,502,153 A * 3/1985 Lapedes et al.
4,768,233 A * 9/1988 Grilliot et al.
4,999,850 A * 3/1991 Grilliot et al.
5,136,723 A * 8/1992 Aldridge et al.
5,189,737 A * 3/1993 Ribicic
5,685,015 A 11/1997 Aldridge
5,884,332 A 3/1999 Snedeker
5,920,905 A * 7/1999 Aldridge
5,933,865 A * 8/1999 Aldridge
2002/0174476 A1 11/2002 Cochran
2003/0110553 A1 6/2003 Aldridge

* cited by examiner

*Primary Examiner*—Tejash Patel
(74) *Attorney, Agent, or Firm*—Wood, Phillips, Katz, Clark & Mortimer

(57) ABSTRACT

A protective garment comprises an outer shell, which provides abrasion resistance and puncture resistance, a thermal liner, and a liner including a moisture barrier. Each liner being adapted to be separately and detachably attached to and within the outer shell. The garment is adapted to be selectively configured with neither said liner so attached or with the thermal liner so attached, for a firefighter fighting a wildland fire, with both said liners so attached, for a firefighter fighting a structural fire, or with the liner including the moisture barrier so attached, for a firefighter engaging in a technical rescue.

5 Claims, 2 Drawing Sheets

PROTECTIVE GARMENT ADAPTED TO BE SELECTIVELY CONFIGURED

Matter enclosed in heavy brackets [ ] appears in the original patent but forms no part of this reissue specification; matter printed in italics indicates the additions made by reissue.

FIELD OF THE INVENTION

This invention pertains to a protective garment, such as a protective garment for a firefighter, which has an outer shell and which can be selectively configured so as to have no liner, one liner, or two liners. Herein, all references to protective garments are to be broadly construed to refer to pants, coats, jackets, overalls, and coveralls.

BACKGROUND OF THE INVENTION

The National Fire Protection Association (NFPA) has promulgated standards—see NFPA 1971 Standard on Protective Ensemble for Structural Firefighting (2000 Edition)—for protective clothing for firefighters fighting structural fires. The National Fire Protection Association has promulgated standards—see NFPA 1977 Standard on Protective Clothing and Equipment for Wildland Firefighting (1998 Edition)—for protective clothing for firefighters engaged in fighting wildland fires. Presently, the National Fire Protection Association is contemplating standards for protective clothing for firefighters engaging in what are known as technical rescues, such as extracting victims from automobile wrecks.

As contemplated by the aforenoted standards for protective clothing for firefighters fighting structural fires, a protective garment has an outer shell, which provides abrasion resistance and puncture resistance, a liner including a moisture barrier, and a thermal liner. Conventionally, as known heretofore, the liner including the moisture barrier and the thermal liner are sewn together or are bonded together, and the sewn-together or bonded-together liners are attached detachably to and within the outer shell by suitable fasteners, such as zippers, hook-and-loop fasteners, and snap fasteners. Thus, if the moisture barrier fails while the thermal liner remains useful, the liner including the moisture barrier cannot be easily replaced, apart from the thermal liner.

Alternatively, as known heretofore, the liner including the moisture barrier is sewn to and within the outer shell and the thermal liner is attached detachably to the outer shell, within the liner including the moisture barrier. Thus, if the moisture barrier fails while the outer shell remains useful, the moisture barrier cannot be easily replaced, apart from the outer shell.

As contemplated by the aforenoted standards for protective clothing for firefighters fighting wildland fires, a protective garment has an outer shell, which provides abrasion resistance and puncture resistance. Although a liner including a moisture barrier and a thermal liner are not needed, a thermal liner may be optionally included, as for wearing under cold winter conditions. If a thermal liner is included, the thermal liner is attached detachably to and within the outer shell by suitable fasteners, such as zippers, hook-and-loop fasteners, or snap fasteners.

The aforenoted standards contemplated for protective garments for firefighters engaging in technical rescues are expected to provide that a protective garment has an outer shell, which provides abrasion resistance and puncture resistance, and a liner including a moisture barrier. Furthermore, the contemplated standards are expected to permit the liner including the moisture barrier to be detachably attached to and within the outer shell by suitable fasteners, such as zippers, hook-and-loop fasteners, or snap fasteners.

Protective garments conforming to the aforenoted standards for protective clothing for firefighters fighting structural fires and protective garments conforming to the aforenoted standards for protective clothing for firefighters fighting wildland fires are available commercially from Morning Pride Manufacturing, L.L.C. of Dayton, Ohio, and from other sources.

SUMMARY OF THE INVENTION

Broadly, this invention provided a protective garment comprising an outer shell and two liners. Each said liner is adapted to be separately and detachably attached to and within the outer shell. The garment is adapted to be selectively configured with neither said liner so attached, with either one of said liners so attached, or with both said liners so attached. Preferably, one such liner is a thermal liner and the other liner includes a moisture barrier. Preferably, moreover, the outer shell provides abrasion resistance, puncture resistance, or both.

Specifically, this invention provides a protective garment that can be selectively configured so as to be particularly suited for a liner fighting a wildland fire, for a firefighter fighting a structural fire, or for a worker engaging in a technical rescue. Thus, the garment comprises an outer shell, which provides abrasion resistance, puncture resistance, or both, a thermal liner, and a separate liner, which includes a moisture barrier. Each said liner is adapted to be separately and detachably attached to and within the outer shell.

Specifically, moreover, the garment is adapted to be selectively configured with neither said liner so attached or with the thermal liner so attached, so as to be particularly suited for a firefighter fighting a wildland fire, with both said liners so attached, so as to be particularly suited for a firefighter fighting a structural fire, or with the separate liner including the moisture barrier so attached, so as to be particularly suited for a firefighter engaging in a technical rescue.

DETAILED DESCRIPTION OF THE ILLUSTRATED EMBODIMENTS

Figure 1A:
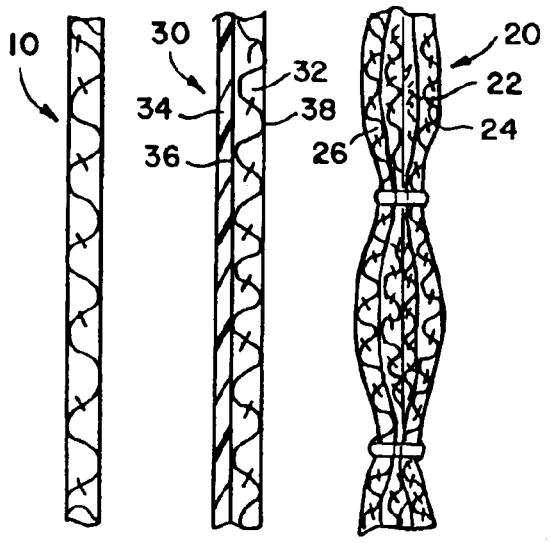
FIG. 1A is a fragmentary, sectional, exploded view of a protective garment embodying this invention in a first embodiment configured with an outer shell, with a thermal liner, and with a liner including a moisture barrier. The liner including the moisture barrier is interposed between the outer shell and the thermal liner so that the moisture barrier faces the outer shell.

As illustrated in FIG. 1A, a protective garment comprising an outer shell 10, a thermal liner 20, and a separate liner 30 is configured so as to be particularly suited for a firefighter fighting a structural fire. The outer shell 10 is woven from fibers, e.g. Kevlar™ fibers, which provide abrasion resistance and puncture resistance. The thermal liner 20 has a fibrous matrix 22, which is disposed between an inner cover 24 and an outer cover 26. The covers 24, 26, may be woven or non-woven and are quilted so as to segregate discrete regions of the fibrous matrix 22.

The separate liner 30, which is interposed between the outer shell 10 and the thermal liner 20, has a fabric matrix 32 and a moisture barrier 34, e.g. a neoprene layer, which is laminated to the fabric matrix 32, on an outer surface 36 of the fabric matrix 32. The outer surface 36 faces the outer shell 10. An inner surface 38 of the fabric matrix 32 faces the outer cover 26 of the thermal liner 20.

Figure 1B:
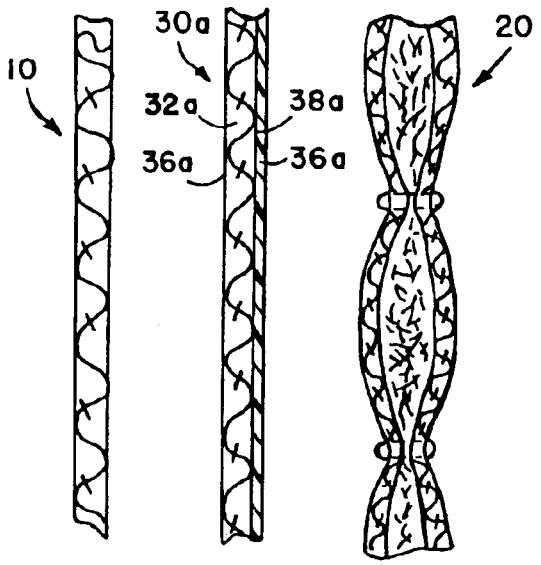
FIG. 1B is a fragmentary, sectional, exploded view of a protective garment embodying this invention in a second embodiment configured with an outer shell, with a thermal liner, and with a liner including a moisture barrier. The liner including the moisture barrier is interposed between the outer shell and the thermal liner so that the moisture barrier faces the thermal liner.

As illustrated in FIG. 1B, a liner 30a including a moisture barrier 34a is substituted for the liner 30 in the protective garment. The liner 30a has a fabric matrix 32a, which is similar to the fabric matrix 32 of the liner 30, which has an outer surface 36a facing the outer shell 10, and on an inner surface 38a of which the moisture barrier 34a, e.g. a Breathe TeX™ layer, is coated.

Figure 2:
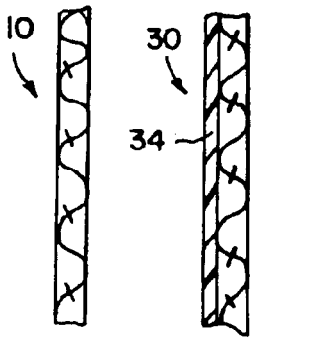
FIG. 2 is a fragmentary, sectional, exploded view of a protective garment embodying this invention in a third embodiment comprising and being configured with an outer shell and with a liner including a moisture barrier but not with a thermal liner. The liner including the moisture barrier is disposed so that the moisture barrier faces the outer shell.

As illustrated in FIG. 2, the protective garment is configured so as to be particularly suited for a liner engaging in a technical rescue. As compared to the protective garment in its configuration illustrated in FIG. 1A, the thermal liner 20 is omitted, whereas the liner 30 including the moisture barrier 34 is included. In an alternative embodiment, which is not to illustrated, the liner 30a including the moisture barrier 34a is substituted for the liner 30 including the moisture barrier 34.

Figure 3:
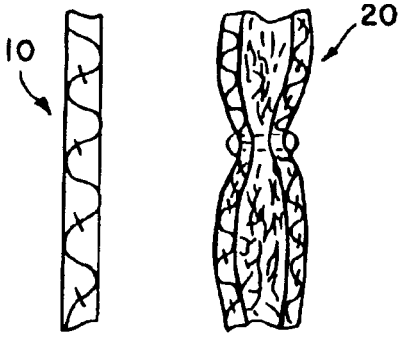
FIG. 3 is a fragmentary, sectional, exploded view of a protective garment embodying this invention in a fourth embodiment comprising and being configured with an outer shell and with a thermal liner but not with a liner including a moisture barrier.
Figure 4:
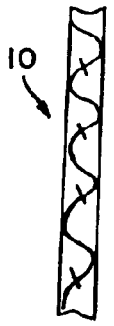
FIG. 4 is a fragmentary view of a protective garment embodying this invention in a fifth embodiment configured with an outer shell but not with a thermal liner and not with a liner including a moisture barrier.

As illustrated in FIG. 3, the protective garment is configured so as to be particularly suited for a firefighter fighting a wildland fire under cold winter conditions. As compared to the protective garment in its configuration illustrated in FIG. 1A, the liner 30 including the moisture barrier 32 is omitted, whereas the thermal liner 20 is included. In an alternative embodiment, which is not illustrated, the protective garment has two thermal liners, each similar to the thermal liner 20 and each attached similarly to the outer shell 10, whereby the protective garment is configured so as to be particularly suited for a firefighter fighting a wildland fire under severely cold conditions. As illustrated in FIG. 4, the thermal liner 20 can be also omitted, whereby the protective garment is configured so as to be particularly suited for a firefighter fighting a wildland fire under comparatively warmer conditions.

Figure 5A:
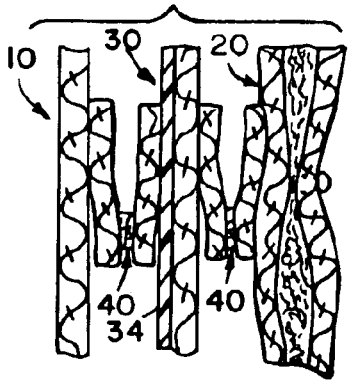
FIGS. 5A, 5B and 5C and FIGS. 6A, 6B, and 6C are fragmentary, sectional, exploded, views of the protective garment of FIG. 1A, wherein the liners are attached detachably to the outer shell by zippers, hook-and-loop fasteners, and snap fasteners respectively.
Figure 5B:
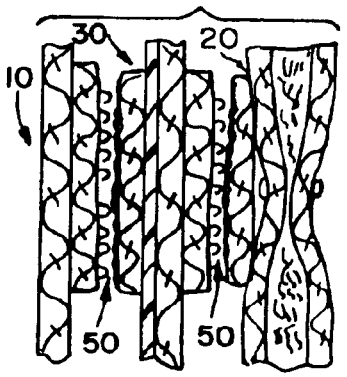
Figure 5C:
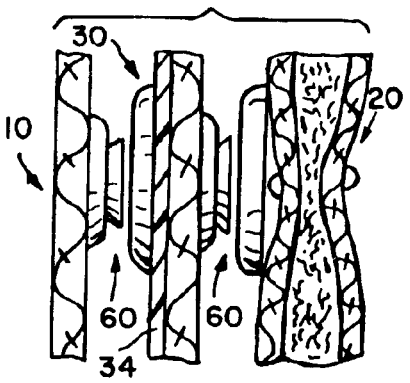

In FIG. 5A, zippers 40 are used to attach the liner 30 including the moisture barrier 34 detachably to the outer shell 10 and to attach the thermal liner 20 detachably to the liner 30 including the moisture barrier 34, whereby the thermal liner 20 is considered to be detachably, albeit indirectly, to the outer shell 10. In FIG. 5B, hook-and-loop fasteners (e.g. VELCRO™ fasteners) are used where zippers 40 are used in FIG. 5A. In FIG. 5C, snap fasteners 60 are used where zippers 40 are used in FIG. 5A.

Figure 6A:
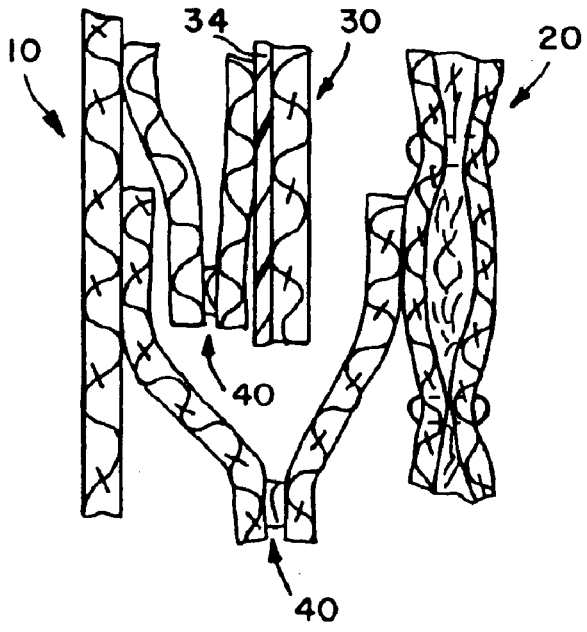
Figure 6B:
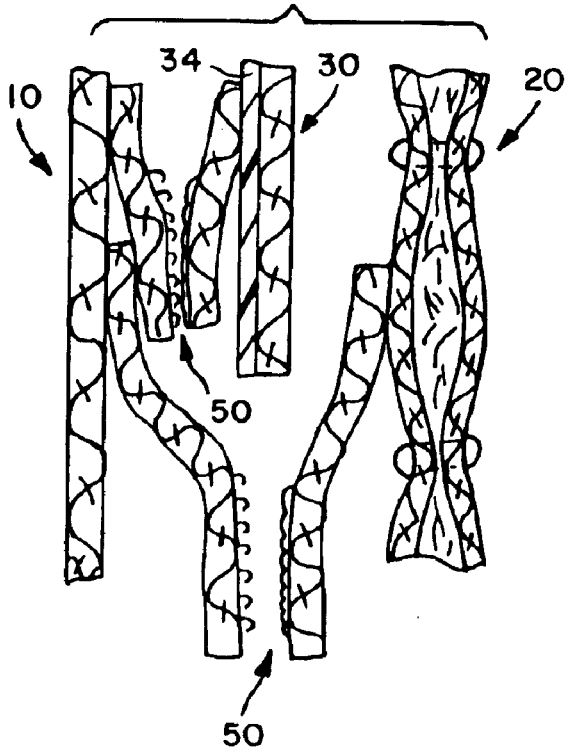
Figure 6C:
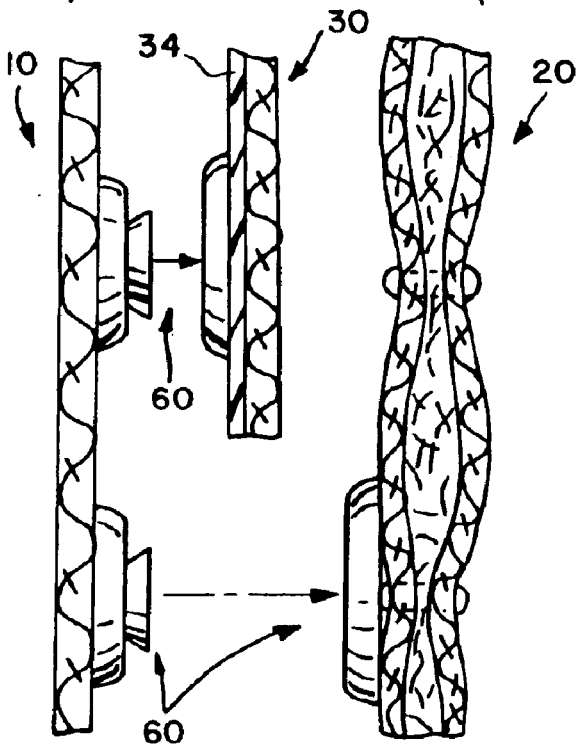

In FIG. 6A, zippers 40 are used to the liner 30 including the moisture barrier 34 detachably to the outer shell 10 and to attach the thermal liner 20 detachably, here directly, to the outer shell 10. In FIG. 6B, hook-and-loop fasteners (e.g. VELCRO™ fasteners) are used where zippers 40 are used in FIG. 6A. In FIG. 6C, snap fasteners 60 are used where zippers 40 are used in FIG. 6A.

Because the liner including the moisture barrier is detachable from the outer shell, apart from the outer shell and apart from the thermal liner, the liner including the moisture barrier can be easily replaced, if the moisture barrier fails while the outer shell and the thermal liner remain useful.

What is claim is:

1. A protective garment comprising an outer shell and two liners, each said liner being attached to and within the outer shell by means permitting said same liner to be detached from the outer shell while permitting but not requiring the other liner to be detached from the outer shell, so that the garment is selectively configured, with either one of said liners so attached, or with both said liners so attached.

2. A protective garment comprising an outer shell, a thermal liner, and a separate liner, which includes a moisture barrier, each said liner being attached to and within the outer shell by means permitting said same liner to be detached from the outer shell while permitting but not requiring the other liner to be detached from the outer shell, so that the garment is selectively configured, with one said liner so attached, or with both said liners so attached.

3. A protective garment comprising an outer shell, which provides abrasion resistance, puncture resistance, or both, a thermal liner, and a separate liner, which includes a moisture barrier, each said liner being attached to and within the outer shell by means permitting said same liner to be detached from the outer shell while permitting but not requiring the other liner to be detached from the outer shell, so that the garment is selectively configured, with one said liner so attached, or with both said liners so attached.

4. A protective garment that can be selectively configured so as to be particularly suited for a firefighter fighting a wildland fire, for a firefighter fighting a structural fire, or for a worker engaging in a technical rescue, the garment comprising an outer shell, which provides abrasion resistance, puncture resistance, or both, a thermal liner, and a separate liner, which includes a moisture barrier, each said liner being attached to and within the outer shell by means permitting said same liner to be detached from the outer shell while permitting but not requiring the other liner to be detached from the outer shell, so that the garment is selectively configured with the thermal liner so attached, so as to be particularly suited for a firefighter fighting a wildland fire, with both said liners so attached, so as to be particularly suited for a firefighter fighting a structural fire, or with the separate liner including the moisture barrier so attached, so as to be particularly suited for a firefighter engaging in a technical rescue.

*5. A protective garment comprising an outer shell and two liners, each said liner being attached within the outer shell and being detachable from within the outer shell while permitting but not requiring the other liner to be detached from within the outer shell, so that the garment is selectively configured, with either one of said liners so attached, or with both said liners so attached.*

* * * * *